United States Patent [19]

Buescher

[11] 4,265,050

[45] May 5, 1981

[54] FLOWER POT WITH CONTROLLED MOISTURE

[76] Inventor: Theodore H. Buescher, 1709 E. Third Pkwy., Washington, Mo. 63090

[21] Appl. No.: 80,436

[22] Filed: Oct. 1, 1979

[51] Int. Cl.³ .............................................. A01G 25/00
[52] U.S. Cl. ...................................... 47/79; 47/71
[58] Field of Search ...................... 47/66–67, 47/71, 79–82

[56] References Cited

U.S. PATENT DOCUMENTS

| 592,556 | 10/1897 | Werner | 47/71 |
|---|---|---|---|
| 910,905 | 1/1909 | Clements | 47/80 |
| 1,213,940 | 1/1917 | Parker et al. | 47/66 |
| 1,297,484 | 3/1919 | Lutey | 47/71 |
| 1,712,986 | 5/1929 | Favata | 47/80 |
| 4,040,207 | 8/1977 | Lancaster | 47/80 |
| 4,070,794 | 1/1978 | Gibbs | 47/79 |
| 4,083,146 | 4/1978 | Brankovic | 47/71 |

Primary Examiner—Robert E. Bagwill
Attorney, Agent, or Firm—Haverstock, Garrett & Roberts

[57] ABSTRACT

This invention relates to a unitary structural flower pot device which provides for controlled emission of moisture about the foliage of a flower or other plant contained therein while simultaneously providing for the conventional watering of the plant root structure coupled with additional means for draining off any potentially stagnating fluid from within the plant medium.

16 Claims, 5 Drawing Figures

FLOWER POT WITH CONTROLLED MOISTURE

BACKGROUND OF THE INVENTION

The present invention relates to a flower pot device for use in providing for the controlled emission of moisture about the outer periphery of a flower or other plant contained therein. The present device provides a relatively humit atmosphere in the immediate vicinity of the plant environment which aids in keeping the plant foliage fresh and clean as well as providing moisture thereto. In addition, the present device simultaneously provides for the conventional watering of the plant root structure with the added feature of draining off any excess fluid retained in the plant medium. Drainage of excess fluid from the plant medium is extremely important because it prevents stagnation and drowning of the root structure and promotes the vigorous and healthy growth thereof.

It is well known that the health of foliage plants not only depends on the amount of water in their soil, but also depends on the moisture in the air surrounding them. One only needs to enter a greenhouse to notice immediately how those plants contained therein thrive in an environment of sufficient humidity. Without a relatively humit atmosphere in the immediate vicinity of the plant to encourage plant growth and vigor, maintenance becomes extremely difficult. Often times plants are over-watered in an effort to compensate for the lack of humidity in the immediate vicinity of the plant environment. This over-watering drowns the root structure of the plant and causes water-logging and stagnation which is detrimental to both plant life and growth. Therefore, it is desirable to increase the humidity in the immediate vicinity of each individual plant while at the same time providing means for preventing stagnation and drowning of the root structure while not interfering with the normal plant maintenance activities.

Many different methods of humidifying and watering plants are known and have been employed for use in providing a relatively humid atmosphere for house plants and the like. All such devices suffer from certain disadvantages and shortcomings including being costly, cumbersome, and sometimes requiring extensive maintenance. The device of this invention overcomes these disadvantages and shortcomings and provides a simple unitary construction which permits easy access to a replenishable reservoir for humidifying the immediate vicinity of the plant foliage while at the same time permitting maximum flexibility in individual plant placement.

The known prior art devices include a variety of humidifying and watering mechanisms adapted for providing moisture about the periphery of a plant foliage; see for examples the constructions shown in Gibbs U.S. Pat. No. 4,070,794; Alwell U.S. Pat. No. 4,067,143; and Adam U.S. Pat. No. 3,753,315. The known constructions for the most part are characterized by complicated and cumbersome mechanisms utilized for either controlling the humidity in the immediate vicinity of a potted plant or for irrigating the plant medium surrounding the plant roots. Although the various mechanisms disclosed in the above-identified patents have attempted to improve the water distribution and the humdifying and aeration characteristics of plants receptacles, many disadvantages and shortcomings still exist. For example, the prior art constructions are relatively large, bulky and cumbersome, and most constructions require attachment means for adapting the particular mechanisms to a conventional flow pot structure. Furthermore, no known device utilizes a unitary structure configuration which provides for the emission of controlled moisture about the foliage of a plant while simultaneously providing for the watering of the plant in a conventional manner with additional means for draining off any potentially stagnating water retained in the plant receptacle. Drainage from the plant receptacle prevents stagnation and drowning of the root structure of the plant and avoids water-logging which would otherwise keep out essential air molecules which are vital to the growth of the root structure and to the activity of beneficial soil organisms. For these and other reasons, the known constructions have enjoyed limited usefulness.

The present device overcomes these and other shortcomings and disadvantages of known prior art devices including the humidifying and irrigation mechanisms disclosed in the named patents, and teaches the construction and operation of a relatively simple construction both structurally and operationally which is also relatively inexpensive to make, use, repair and replace. The present device can be easily and conveniently molded into a unitary structure or it can be comprised of easily fabricated component parts assembled into a unitary structural configuration. In either construction, the present device is adaptable for use with individual plants so as to permit maximum versatility and flexibility in plant arrangement and placement.

SUMMARY OF THE INVENTION

The present flower pot device for use in providing for the emission of controlled moisture about the periphery of a flower or other plant contained therein includes an inner container member having a bottom wall portion and an annular side wall portion extending upwardly therefrom adaptable for holding the potting soil and the root structure of a plant therein. The inner container member is preferably made from impermeable materials and has an annular perforated surface portion centrally located on the bottom wall portion which allows any excess water added to the soil or plant medium to percolate down through the root structure of the plant and exit through the plurality of small performations located therein. This drainage of excess fluid from within the inner container member is important to the present invention because it prevents excess water from collecting and stagnating in the inner member thereby avoiding stagnation and drowning of the root structure caused by over-watering. In addition, drainage of the excess fluid also eliminates objectionable odors due to the collection of stagnant water within the potting soil and avoids water-logging which would otherwise keep out essential air molecules vital to the growth and vigor of the plant and to the activity of beneficial soil organisms.

An oter container member is positioned adjacent to and is engageable with the bottom portion of the inner member so as to form a unitary structural configuration therebetween. This outer member also includes a bottom wall portion having an annular opening therethrough so as to allow for the uninhibited passage of an excess fluid contained in the inner member. The outer member also includes an annular side wall portion which is concentrically located with the side wall portion of the inner member forming an annular reservoir therebetween which is adaptable to hold a liquid therein. This annular reservoir is also of special importance to the present invention because it provides the sole means for controlling the humidity in the immediate vicinity of the plant. When this annular reservoir is filled with water, the process of water evaporation provides a high-humidity atmosphere which rises and flows directly upward around the outer periphery of a flower or plant thereby providing a concentration of water vapor to the plant foliage. It is this increase in the humidity immediately surrounding the vicinity of the plant which promotes the general health of the foliage.

The present device further includes a basin member structured so as to catch and hold a liquid therein which is positiioned adjacent to and is engageable with the bottom wall portion of the outer container member also forming a unitary structure configuration therewith. Also important to the present construction is the fact that a discharge passageway communicates the annular perforated surface portion of the inner member with the basin member for drainage of the excess fluid therefrom. It should likewise be noted that the annular opening in the bottom wall portion of the outer member is in axial alignment with the annular perforated surface portion of the inner member so that any excess fluid may be freely transferred from the inner container member to the basin member without obstruction.

An annular cap member is positioned adjacent to and engageable with the side wall portions of both the inner and outer container members. This cap member has a plurality of openings extending therethrough and is dimensioned so as to cover the peripheral annular reservoir formed between the inner and outer members in order to control the emission of moisture about the upper leafy portion of the flower or other plant. It should be noted that the present construction is adapted for use with individual plants and the entire structure is preferably made of a non-porous material such as plastic. In addition, the present construction can be either molded into a unitary structure or fabricated and assembled from component parts. Regardless of the method of construction, the present device provides for increased humidity in the immediate vicinity of the plant foliage and provides an environment which effectively promotes plant life and growth.

It is therefore a principal object of the present invention to provide a flower pot device having integral means associated therewith for providing the controlled emission of moisture about the foliage of a flower or other plant contained therein thereby increasing the humidity in the immediate vicinity of said flower or plant to encourage growth and vigor.

Another object is to provide means for effectively draining off any potentially stagnating excess water retained in the plant receptacle so as to prevent stagnation and drowning of the root structure of the plant.

Another object is to provide a unitary structural configuration for use with an individual flower or plant so as to permit maximum flexibility and versatility in plant arrangement and placement.

Another object is to provide a flower pot device which can be easily cleaned and maintained in an attractive condition without great effort or expense, yet will not interfere with normal plant maintenance activities.

Another object is to provide a relatively inexpensive construction which is lightweight, durable and requires relatively little maintenance.

Another object is to provide an easily accessible reservoir which is integral with the remaining structure and which can be periodically replenished with fluid to constantly humidify the flower or other plant contained in said flower pot device.

Another object is to provide a relatively simple flower pot construction which can be economically produced for both commercial and non-commercial use.

Another object is to provide a flower pot device which can be conveniently sized and shaped in a variety of structural configurations such as a rectangular or circular configuration.

Another object is to provide a flower pot device which is decorative, ornamental and attractive in appearance and which is aesthetically pleasing to the eye.

Another object is to provide a flower pot device which can be made in a variety of colors and designs as desired so as to match the decor and motif of the environment in which it is used.

These and other objects and advantages of the present invention will become apparent to those skilled in the art after considering the following detailed specification in conjunction with the accompanying drawings.

DETAILED DESCRIPTION

Figure 1:
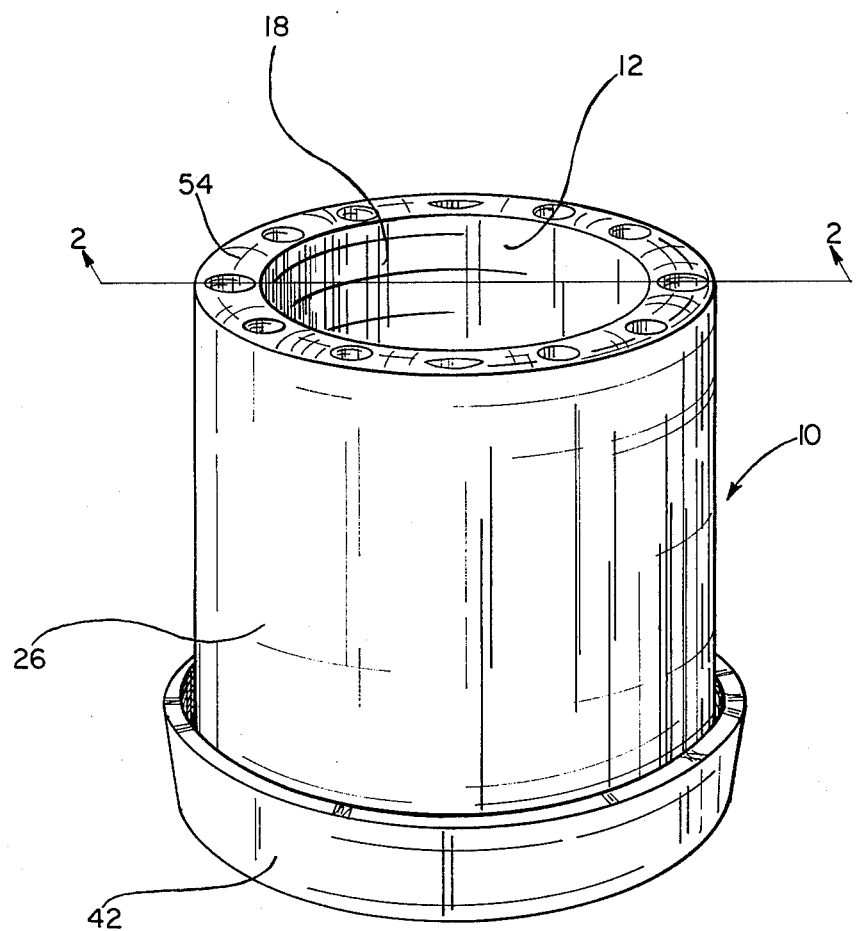
FIG. 1 is a perspective view showing a flower pot device constructed according to the teachings of the present invention

Referring to the drawings more particularly by reference numbers and wherein like numerals refer to like parts, number 10 in FIG. 1 indicates a flower pot device constructed according to the teachings of the present invention. The flower pot device 10 is shown in its unitary structural configuration having members which include an inner container member 12, an outer container member 26, a basin member 42 adapted to catch and hold a fluid therein, and an annular cap member 54 engageable with the upper portion of both the inner and outer container members. An annular cavity 18 is formed by the inner container member 12 adaptable to hold the potting soil and root structure of an individual flower or plant. Although it is anticipated that the present device 10 can be easily fabricated and assembled from individual component parts, it is likewise anticipated that the subject construction can be conveniently molded into a unitary structure eliminating the need for the assembly of component parts. If component parts are utilized, it is of special importance to the teachings of the present construction that the individual component parts be easily and quickly assembled to form an integral structure adapted for holding a single plant so as to permit maximum flexibility and versatility in plant placement and arrangement. In either mode of construction, this self-contained unit provides an extremely healthy environment which promotes plant growth and vigor and at the same time provides the user with maximum flexibility in movement and normal plant maintenance activities. In addition, the present device 10 can be conveniently and attractively designed and shaped in a variety of colors and artistic designs as desired so as to match the decor and motif of the environment in which it is used. For example, it can be utilized as a decorative accessory in residential dwellings, airports, reception rooms, and in any other residential or commercial setting.

Figure 2:
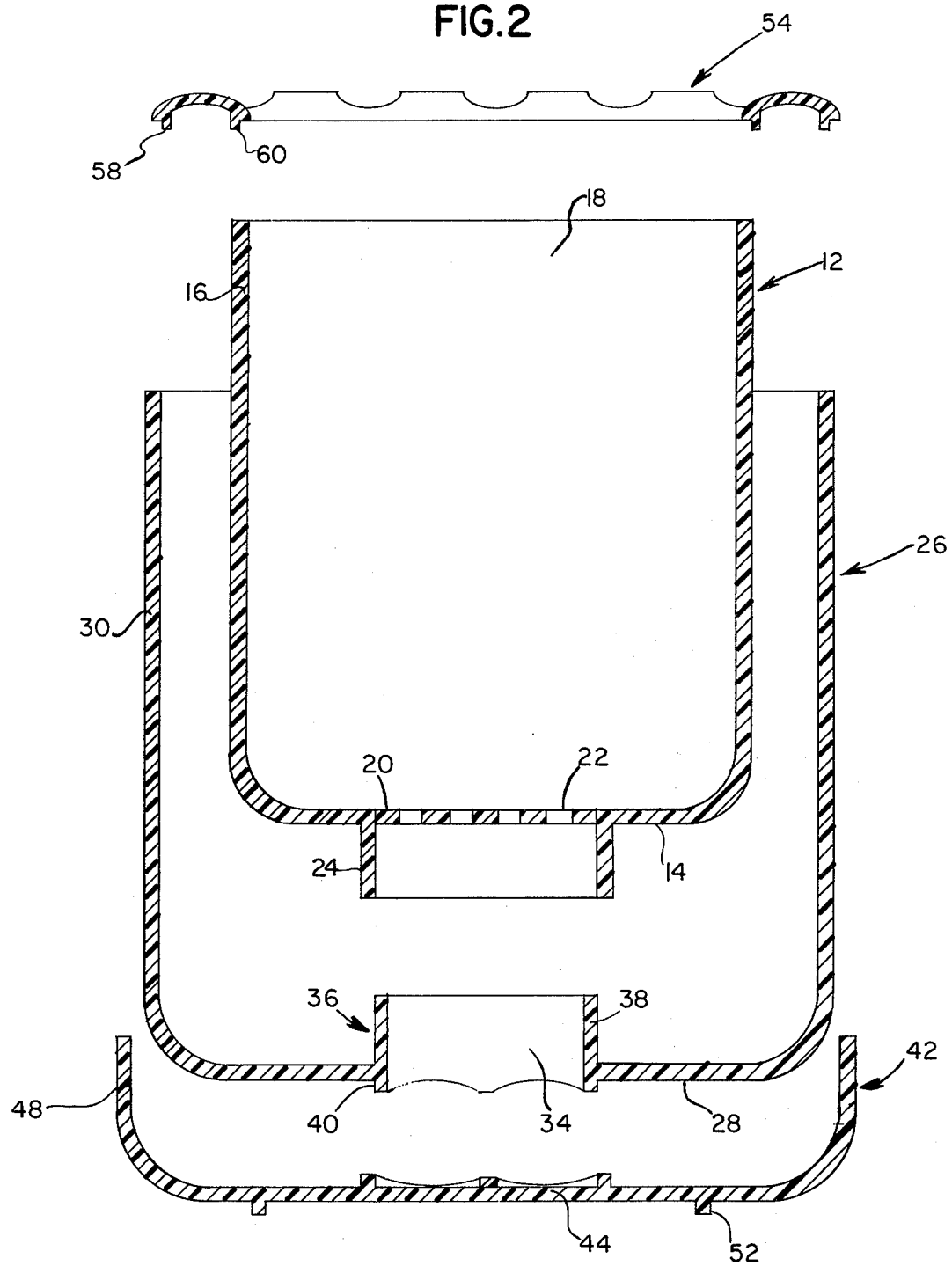
FIG. 2 is an exploded cross-sectional view taken along line 2—2 of FIG. 2 showing the present device in detached assembly.
Figure 4:
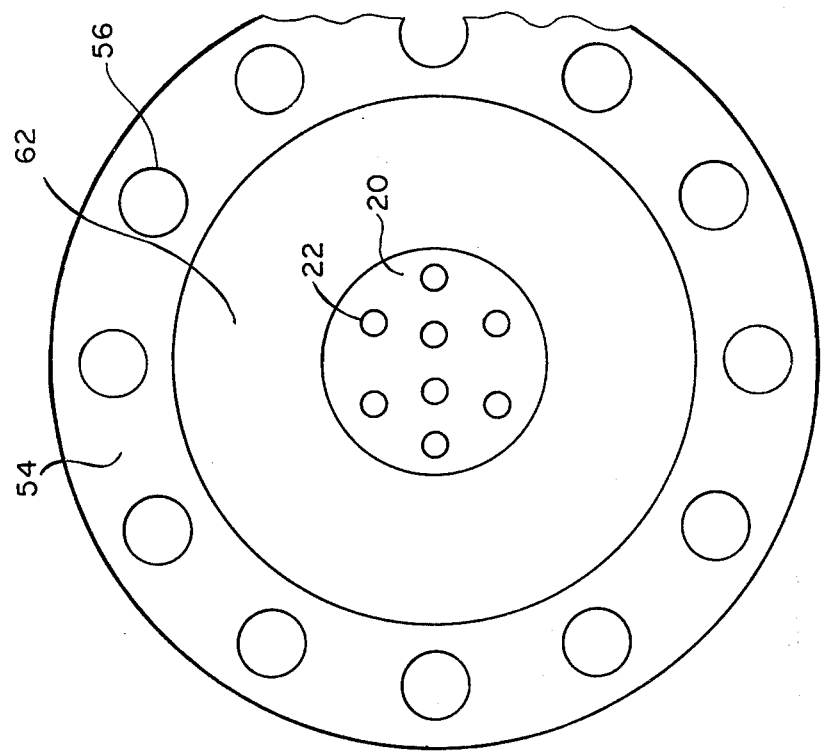
FIG. 4 is a top plan form view of the present device showing the perforated surface portion of the inner container member and perforated cap member.

Referring to FIG. 2, the flower pot device 10 includes a substantially U-shaped inner container member 12 having a bottom wall portion 14 and an annular side wall portion 16 extending upwardly therefrom. The inner member 12 forms an annular cavity 18 adaptable for holding the potting soil or other plant medium and the root structure of an individual flower of foliage plant. The bottom wall portion 14 includes an annular flange portion 24 extending downwardly therefrom and defines the perimeter of an annular surface portion 20 as shown in FIG. 4 which is centrally located thereon and has a plurality of small perforations 22 extending therethrough. The perforations 22 located on the bottom wall portion 14 are important to the present invention because they allow moisture to percolate down through the potting soil or plant medium thereby providing for the drainage of an excess moisture which might otherwise collect and remain within the inner container member. Drainage of excess fluid from within the inner member is critical to proper plant maintenance because it substantially promotes the health and growth of the root structure of a plant contained therein. As so often happens, house plants are oftentimes over-watered and if no means are available for draining off this excess water, it will collct and be retained within the plant receptacle thereby completely saturating the root structure contained therein. This potentially stagnating excess water completely water-logs the root structure and inhibits growth while promoting decay. The perforation 22 allow for proper drainage of any excess water contained within the annular cavity 18 and avoids water-logging which would otherwise keep out essential air molecules which are vital to the growth of the root structure and to the activity of beneficial soil organisms. This drainage prevents stagnation and drowning of the root structure and eliminates objectional odors caused by the stagnating water retained within the potting soil or plant medium.

Figure 3:
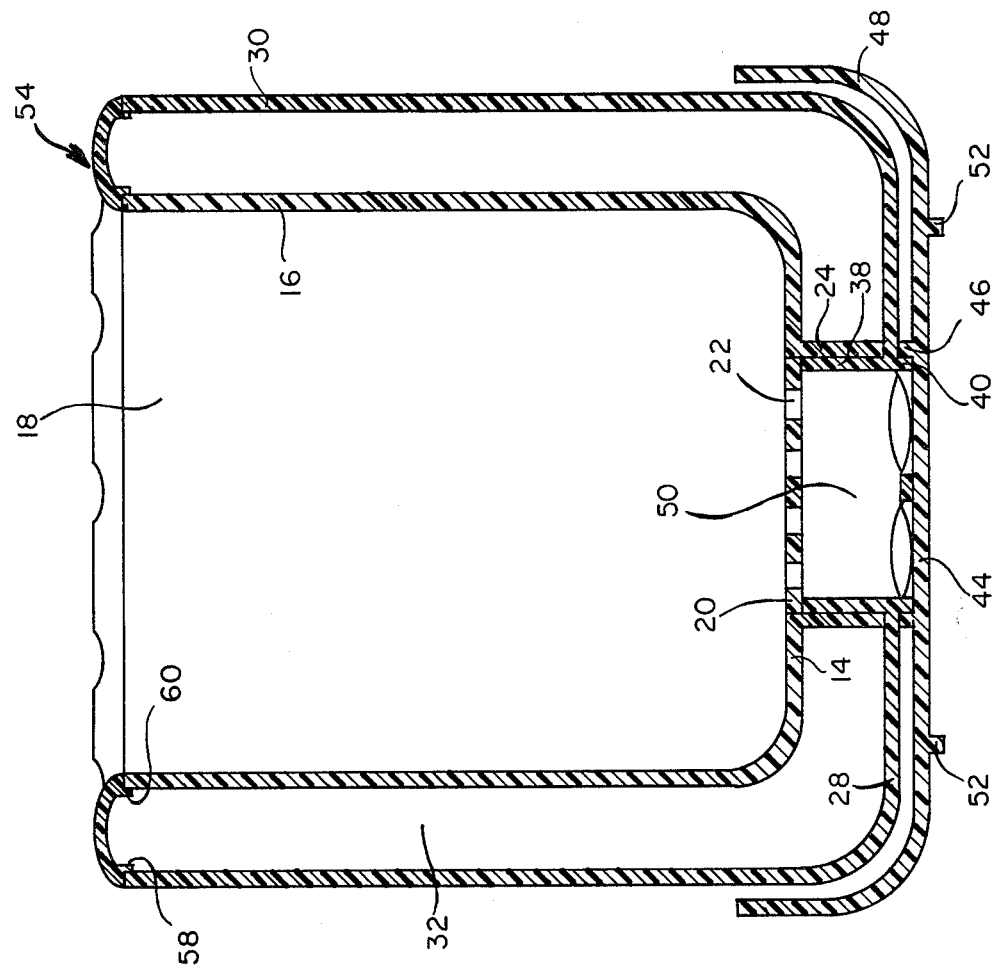
FIG. 3 is a cross-sectional view taken along the line 2—2 of FIG. 1 showing the present device fully assembled.
Figure 5:
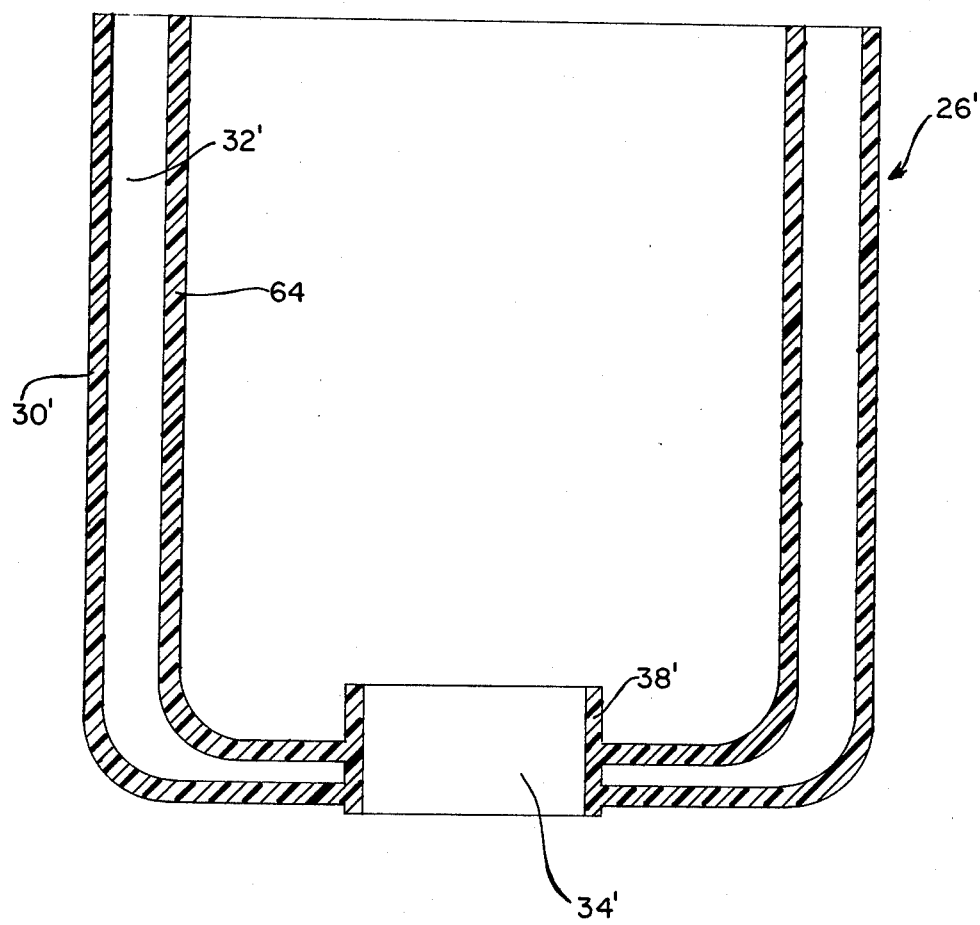
FIG. 5 is a cross-sectional view showing an alternative embodiment of the outer container member.

A substantially U-shaped outer container member 26 is positioned adjacent to and is engageable with the annular flange portion 24 of the inner container member 12. The outer member 26 likewise includes a bottom wall portion 28 and an annular side wall portion 30 extending upwardly therefrom and completely enclosing the inner member 12. The annular side wall portion 30 is concentrically located with the side wall portion 16 of inner member 12 and is in spaced apart relationship therewith forming an annular reservoir 32 as shown in FIG. 3 between the respective side wall portions of the inner and outer container member adapted to hold a fluid therein. The bottom wall portion 28 has an annular opening 34 extending therethrough in axial alignment with the annular perforated surface portion 20 of the inner member 12. An annular flange 36 defines the perimeter of the opening 34 and has a portion 38 thereof extending upwardly from bottom wall portion 28 into telescoping engagement with flange portion 24 as shown in FIG. 3. It is important that flange portions 24 and 38 cooperatively engage in close abutting relationship with each other so as to form a suitable seal therebetween thereby preventing the backflow of fluid from the reservoir 32 into opening 34. This telescoping engagement of flange portions 24 and 38 isolates the peripheral reservoir 32 from the remaining structure while at the same time being an integral part thereof. It is also recognized that any other suitable connecting means, such as threaded means, can be likewise utilized so long as a suitable seal is formed between flange members 24 and 38. In addition, it is also anticipated that the outer member 26 may be alternatively structured so as to integrally include a self-contained reservoir 32' as shown in FIG. 5 thereby eliminating the need for a seal between members 24 and 38. Additionally, the side wall portion 30 of outer member 26 may likewise have associated therewith one or more ribbed flange portions or convalutions (not shown) projecting inwardly therefrom so as to add additional stability to the overall structure.

When reservoir 32 is completely or partially filled with water, the process of water evaporation provides a high-humidity atmosphere which rises above the device 10 and flows upwardly around the periphery of a flower or plant contained in cavity 18. It is this evaporation process which increases the humidity in the immediate vicinity of the plant thereby providing a relatively humid atmosphere for promoting the overall health and appearance of foliage plants. Experimentation has revealed that the evaporation and humidifying process produced by the present construction effectively increases the humidity in the immediate vicinity of a plant contained therein from approximately 100 percent to 500 percent, depending upon both room temperature and the particular hour of the day. In addition, numerous additives such as surface tension reducers may be mixed with the water or other fluid contained within the reservoir to improve the volatility of the fluid therein thereby enhancing the evaporation and vaporization process and effectively providing for increase humidity about the outer periphery of the plant. Additionally, resevoir 32 is easily accessable and can be periodically replenished without interfering with the plant medium or normal plant maintenance. It should also be noted that when the inner and outer container members 12 and 26 are assembled in their unitary structural configuration, annular opening 34 is axially aligned with the annular perforated surface portion 20 so that the drainage of excess fluid therefrom will pass uninhibited through opening 34. Additionally, it is anticipated that annular opening 34 may alternatively consist of an annular perforated surface portion centrally located on the bottom wall portion 28 of outer member 26 substantially similar to the perforated surface portion 20 of inner member 12.

The present device 10 further includes a removable basin member 42 positioned adjacent to the bottom end portion 28 of outer member 26 including a similar bottom wall portion 44 having a corresponding annular flange portion 46 extending upwardly therefrom into telescoping engagement with the downwardly extending flange portion 40 of outer member 26. Flange portions 40 and 46 are similarly engageable in close abutting relationship as shown in FIG. 3 thereby allowing the basin member 42 to form a unitary structural configuration with members 12 and 26. Basin member 42 likewise has an annular side wall portion 48 extending upwardly from the bottom wall portion 44 and is structured so as to catch and hold a liquid therein. It should be noted that side wall portion 48 is considerably shorter in height and concentrically located with side wall portions 16 and 30 respectively. When members 12, 26 and 42 are either molded or assembled in their unitary configuration, a discharge passageway 50 as shown in FIG. 3 is formed within the telescoping annular flange portions 24, 38, 40 and 46 communicating the annular perforated surface portion 20 with basin member 42. The discharge passageway 50 allows the excess fluid contained in inner member 12 to percolate down through the potting soil or plant medium and into the basin member 42. Basin member 42 is quickly and easily removable from the bottom wall portion of outer member 26 so that the excess fluid collected therein can be easily washed away or removed. If, on the other hand, basin member 42 is molded into a unitary structure with members 12 and 26, the bottom wall portion 44 would then include a drain plug (not shown) or other suitable drain means for easy removal of the excess fluid collected therein. It should also be noted that this excess fluid may likewise be reused for watering the plant root structure, especially if such fluid contains liquid fertilizers or other similar additives and nutrients essential for promoting the health and vigor of potted plants. In addition, basin member 42 has means associated therewith whereby the excess fluid which drains from inner member 12 through the discharge passageway 50 is easily diffused into basin member 42. One example of such diffusion means would be a plurality of small perforations (not shown) located on flange portions 40 and 46 which would allow the excess fluid to freely flow into basin member 42. It is also recognized that other suitable diffusion means can likewise be utilized. Additionally, bottom wall portion 44 may also include an annular flange portion 52 extending downwardly therefrom upon which the entire structure may rest. This flange portion 52 is optional and adds additional stability to and functionally supports the entire unitary structure of the present device.

An annular cap member 54 as shown in FIGS. 2, 3 and 4 is positioned adjacent to and is engageable with the side wall portions 16 and 30 of container members 12 and 26 respectfully. The cap member 54 is structured and dimensioned so as to cover the peripherial reservoir 32 formed between the inner and outer members respectively and has a plurality of openings 56 therethrough as shown in FIG. 4 which provides for the controlled emission of moisture from reservoir 32 to the upper leafy portion of the flower or plant contained within cavity 18. The cap member 54 has annnular flange members 58 and 60 as shown in FIGS. 2 and 3 which cooperatively engage with side wall portions 16 and 30 and hold cap member 54 in locking engagement thereon. It should be noted that the total number of openings 56 controls the amount of moisture emitted upwardly about the plant foliage and this number can be varied so as to regulate the amount of water vapor released depending upon the particular plant requirements. This feature is important because it provides for the controlled emission of moisture about the outer periphery of foliage plants. In addition, cap member 54 likewise adds additional stability to the overall structure, enhances its finished appearance and can be easily removed therefrom so that reservoir 32 can be easily replenished.

FIG. 3 shows the present device 10 either molded or assembled in its unitary structural configuration. It should be noted that the interlocking annular flange portions 24, 38, 40 and 46 form the discharge port 50 which communicates at one end with the annular perforated surface portion 20 of inner member 12 and at its other end with the basin member 42 to provide for the drainage of excess fluid contained within the plant medium cavity 18. FIG. 3 thus discloses a unitary flower pot device characterized by allowing for the controlled release of moisture from the annular reservoir 32 about the periphery of the plant foliage and in addition providing means, namely the annular perforated surface portion 20 and discharge port 50, for draining excess fluid from within inner member 12 to prevent stagnation and drowning of the root structure contained therein.

FIG. 4 discloses the details of both the annular perforated surface portion 20 of the inner container member 12 and the perforated cap member 54. It should be noted that cap member 54 only covers the annular reservoir 32 and has an annular opening 62 therein which corresponds to and is axially aligned with the annular cavity 18 of inner member 12 so that the plant foliage may extend therethrough.

FIG. 5 discloses an alternative embodiment 26' of the outer container member wherein side wall portion 30', opening 34' and flange portion 38' are constructed similarly to corresponding portions of the outer member 26 shown in FIG. 2. In the embodiment of FIG. 5, an annular side wall portion 64 is concentrically located within side wall portion 30' and is in spaced apart relationship therewith forming a self-contained annular reservoir 32', similar to reservoir 32, adapted to hold a fluid therein. This alternative construction of the peripheral reservoir eliminates the need for a suitable seal between members 24 and 38' and completely avoids the backflow and seepage problem associated therewith.

Although it is recognized that various materials of construction are available, it is preferred that the present device 10 be constructed of an impermeable nonporous material such as certain plastic materials which are both readily available and inexpensive. For example, the present device could be made from polycarbonates by a molding process or by making sheets and cutting and forming the same by adhesive attachment into the desired configuration. Other plastic materials may be used such as nylon reinforced with fibers such as glass fibers, polyesters reinforced with fibers such as glass fibers, and other types of plastic materials such as polyolefins, e.g., polyethylene, polypropylene, vinyls, such as polyvinyl chlorides, acrylonitrile-styrene-butadiene co-polymers and many other rigid plastic materials may likewise be used. Such plastic members could be easily injection molded and snapped into place prior to use or the entire unit could be molded into a unitary structure.

Various plastic components are preferred over the conventional clay pot structure commonly utilized because the composition of clay pots is such that they loose as much moisture through their side wall portions as a plant contained therein would normally utilize for its normal growth process thereby requiring plant watering much more often. In addition, nutrients and fertilizer salts escape through the side wall portions of clay pots causing an unsightly appearance and destroy the decorative and ornamental value of the unit. The present device would allow all such nutrients and fertilizer salts to drain down into the basin member positioned below the plant medium from where all such items would be quickly and easily washed away, removed or even reused.

In addition, the construction of the present device can also be made from conventional metal moldings. Any well known sheet construction material may be used in the practice of this invention. Stainless steel, aluminum, bronze and rigid copper alloys would likewise work very well in this invention but would be more expensive than plastic materials. Also iron alloys may be used in the practice of this invention but would tend to rust and require frequent cleaning. Likewise, brass sheeting may be used in the practice of this invention but would likewise be quite expensive.

Similarly, color and artistic designs may be easily incorporated in and on translucent plastic materials for enhancing the beauty and functional operation of the device. In addition, it is also recognized that the side wall portions of the present device may be conveniently fashioned into a variety of sizes and configurations, for example, a triangular, rectangular, hexagonal, circular, or other configuration, without impairing the teachings and practice of the present construction. The simplicity, durability, flexibility and versatily of the present device greatly increases its usefulness and effectiveness for encouraging and promoting plant growth. Furthermore, its unique design which provides for the conventional watering of the plant root structure with the added feature of draining off excess fluid from within the plant medium and coupled with a system for feeding the upper leafy portions of a plant contained therein all at the same time are of special importance to the teachings and practice of the present invention.

Thus there has been shown and described a novel flower pot construction for use in providing for the controlled emission of moisture about the foliage of a flower or other plant contained therein, which flower pot construction fulfills all of the objects and advantages sought therefor. Many changes, modifications, variations and other uses and applications of the present flower pot construction will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A flower pot device for use in providing for the controlled emission of moisture about the foliage of a flower or other plant contained therein while at the same time providing for the drainage and collection of any excess fluid from within the plant medium, said device comprising an inner container member adapted for holding potting soil and a plant, means associated with said inner member for draining the excess fluid therefrom, container means disposed exteriorly about said inner container member adaptable to hold a liquid therein, a basin member positioned adjacent to and engageable with said container means adaptable to catch and hold a liquid therein, discharge means communicating said inner container member with said basin member for drainage of the excess fluid therefrom, and a member cooperatively engageable with said container means for controlling the amount of moisture emitted about the periphery of a flower or other plant contained therein.

2. The flower pot device defined in claim 1 wherein said inner container member includes a bottom wall portion and a side wall portion extending upwardly therefrom and wherein said means associated with said inner member for draining the excess fluid therefrom includes an annular surface portion centrally located on said bottom wall portion, said annular surface portion having a plurality of perforations extending therethrough for the drainage of excess fluid from said inner member.

3. The flower pot device defined in claim 1 wherein said container means forms a peripherial reservoir about said inner member so as to permit the liquid therein to evaporate and flow directly upward about the plant foliage providing a humid atmosphere in the immediate vicinity thereof.

4. The flower pot device defined in claim 1 wherein said member for controlling the amount of moisture emitted therefrom includes a plurality of openings therethrough so as to control the flow of moisture about the outer periphery of a flower or other plant foliage contained therein.

5. The flower pot device defined in claim 1 wherein said device is made from impermeable non-porous materials.

6. A flower pot device for use in providing for the controlled emission of moisture about the foliage of a flower or other plant contained therein while at the same time providing for the drainage and collection of any excess fluid from within the plant medium, said device comprising a substantially U-shaped inner container member adapted for holding potting soil and a plant, said inner container member including a bottom wall portion and an annular side wall portion extending upwardly therefrom, said bottom wall portion including an annular surface portion centrally located thereon having a plurality of perforations extending therethrough for the drainage of excess fluid therefrom, a substantially U-shaped outer container member positioned adjacent to and engageable with the bottom wall portion of said inner member, said outer member including a bottom wall portion having an annular opening therethrough and an annular side wall portion extending upwardly therefrom, said annular side wall portion being concentrically located with the side wall portion of said inner member and forming an annular reservoir therebetween adaptable to hold a liquid therein, removable means positioned adjacent to and engageable with the bottom wall portion of said outer container member adaptable to catch and hold a liquid therein, a discharge passageway communicating the annular perforated surface portion of said inner member with said removable means for drainage of the excess fluid therefrom, and an annular cap member positioned adjacent to and cooperatively engageable with the side wall portions of said inner and outer container members, said cap member having a plurality of openings therethrough so as to control the emission of moisture from said annular reservoir about the upper leafy portion of a flower or other plant foliage contained therein.

7. The flower pot device defined in claim 6 wherein the bottom wall portion of said inner container member includes an annular flange portion extending downwardly therefrom defining the perimeter of said annular perforated surface portion centrally located thereon, said annular flange portion being cooperatively engageable with said outer container member.

8. The flower pot device defined in claim 7 wherein said outer container member includes an annular flange portion extending around the perimeter of said annular opening located within the bottom wall portion of said outer member, said annular flange portion having a portion thereof extending upwardly from said bottom wall portion and into engagement with the annular flange portion of said inner member, and said annular flange portion having another portion thereof extending downwardly from said bottom wall portion and into engagement with said removable means.

9. The flower pot device defined in claim 8 wherein said removable means includes a basin member having a bottom wall portion and an annular side wall portion extending upwardly therefrom, said side wall portion being considerably shorter in height and concentrically located with the side wall portions of said inner and outer container members, said bottom wall portion having an annular flange portion extending upwardly therefrom, said flange portion being engageable with the annular flange portion of said outer container member.

10. The flower pot device defined in claim 9 wherein the bottom wall portion of said member includes an annular flange portion extending downwardly therefrom to add stability thereto and functionally support said device.

11. The flower pot device defined in claim 6 wherein said removable means includes other means associated therewith for effectively diffusing the flow of excess fluid therewithin.

12. The flower pot device defined in claim 6 wherein said annular opening in the bottom wall portion of said outer container member is positioned in axial alignment with the annular perforated surface portion of said inner member for drainage of the excess fluid therethrough.

13. The flower pot device defined in claim 6 wherein said annular cap member is so dimensioned as to cover the annular reservoir formed between the inner and outer container members.

14. The flower pot device defined in claim 6 wherein said side wall portions of said inner and outer container members define a circular configuration.

15. The flower pot device defined in claim 6 wherein said side wall portions of said inner and outer container members define a rectangular configuration.

16. The flower pot device defined in claim 6 wherein said device is made from impermeable non-porous materials.

* * * * *